UNITED STATES PATENT OFFICE.

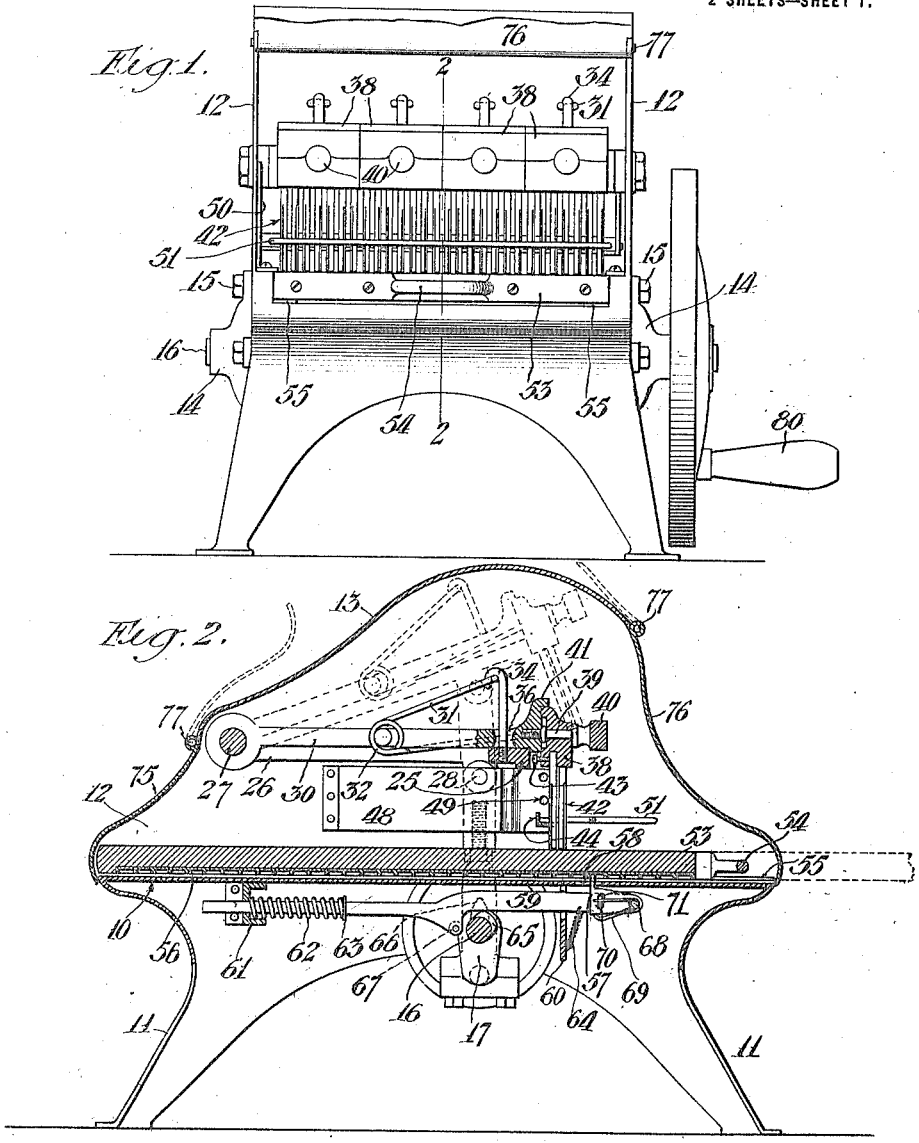

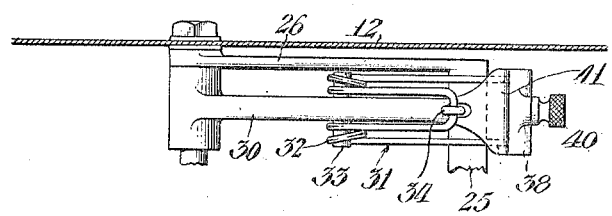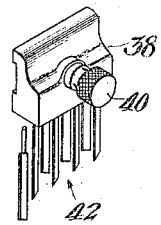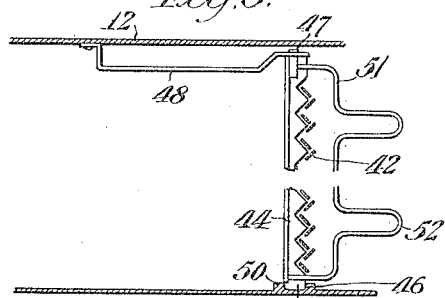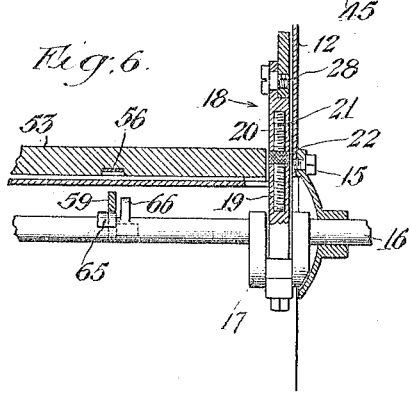

THOMAS J. CARRIGAN AND JOHN B. EASTMAN, OF LOS ANGELES, AND MATTHEW E. MAGILL, OF PASADENA, CALIFORNIA; SAID EASTMAN AND SAID MAGILL ASSIGNORS TO SAID CARRIGAN.

SINEW-CUTTING MACHINE.

1,255,386.  Specification of Letters Patent.  Patented Feb. 5, 1918.

Application filed November 29, 1916. Serial No. 134,206.

*To all whom it may concern:*

Be it known that we, THOMAS J. CARRIGAN, JOHN B. EASTMAN, and MATTHEW E. MAGILL, all citizens of the United States, the two former residing at Los Angeles, in the county of Los Angeles and State of California, and the latter residing at Pasadena, in the county of Los Angeles and State of California, have invented a new and useful Sinew-Cutting Machine, of which the following is a specification.

Our invention relates to that class of devices which are used for cutting fibrous meats, it being well known that some cuts of meat are not as desirable as others by reason of the fact that such portions of meat contain a great deal of fibrous or tough material. By breaking down or cutting the sinews or fiber, such cuts of meat are rendered more desirable. It frequently happens that in meats of this class there may occur portions of bone, or other hard substance, which might seriously damage the cutting elements of the machine, unless provision were made against such occurrences, and one of the main objects of our invention is to produce a machine of the class described of simple form and construction in which the cutters are arranged in groups, each group being separately elastically held in the cutting position.

Other objects and advantages will appear hereinafter from the following description.

Referring to the drawings, which are for illustrative purposes only:

Figure 1 is a front elevation of a machine embodying a form of our invention, the front door being raised to show the interior of the machine.

Fig. 2 is a vertical sectional view on line 2—2 Fig. 1.

Fig. 3 is a plan view, partly in section, of one of the cutting elements, showing the manner in which the same is mounted, and the elastic tension means thereon.

Fig. 4 is a perspective view of one of the cutting elements.

Fig. 5 is a plan view, partly in section, showing the stripper plate, and the manner of mounting the same, together with the knives shown in relation thereto.

Fig. 6 is a front elevation of a portion of one end of the driving shaft, showing the adjacent parts of the machine in section.

The machine comprises a table 10 horizontally disposed and supported on legs 11 which form extensions of side walls 12, the side walls being connected at their upper portion by a top or cover 13 which may be secured to the side walls in any suitable manner, or formed as a part thereof.

14, 14 designate brackets secured to the side walls 12 by means of suitable bolts 15, in which brackets is journaled a shaft 16, said shaft being provided with cranks 17. Mounted upon each crank 17 is a connecting rod 18 formed in two parts 19 and 20 which are adjusted with relation to each other by means of a threaded bolt 21 having a knurled nut 22 thereon to facilitate such adjustment.

25 designates a cutter frame which terminates at each end in rearwardly extending arms 26, which arms 26 are pivotally mounted on a shaft 27 mounted in the respective side walls 12. The arms 26 on the cutter frame 25 are pivotally connected as indicated at 28 to the upper ends of the connecting rods 18.

30, 30 designate a series of spring arms pivotally mounted at their rear ends on the shaft 27 and being held in engagement with the upper face of the cutter frame 25 at their outer ends by means of a U-shaped spring member 31 having coils 32 intermediate its length, which coils engage studs 33 mounted on the spring arms 30. The upper end of the spring 31 is engaged by a hook 34 mounted on the cutter frame 25 and extends upwardly through a hole 36 formed in the spring arm 30. The opposite end of each spring 31 extends forwardly and is secured in any suitable manner in the spring arm, the action of the spring being to elastically hold the spring arm seated upon the upper face of the cutter frame.

38, 38 designate a series of cutter heads, each spring arm 30 being provided with a cutter head which is secured to the face or outer end of the respective spring arms 30 by means of a threaded bolt 39 having a suitable head 40 for operation of the bolt. Each spring arm 30 is provided with an outwardly extending flange or lip 41 along its upper front edge under which the upper edge of its respective cutter head engages.

42, 42 designate a series of cutting blades sharpened at their lower ends and terminating at their upper ends in round shanks which enter holes formed in the lower face of the cutter head, being held therein by means of screws 43.

44 designates a stripper plate having a V-shaped front edge, such V-shaped front edge being so formed that it engages between the respective cutting blades, such blades being arranged and secured in the cutter heads in substantially V-shaped fashion, as shown in Fig. 5. The stripper plate 44 is substantially an angle-bar in cross section, one end of which terminates in a flat member 45 which extends in a socket 46 formed on one of the side walls of the machine, the other end of the stripper plate being provided with a pin 47 which extends into an opening formed in a spring plate 48 secured in any suitable manner to the opposite side wall of the machine, there being a number of openings 49 in the spring plate 48 and a corresponding number of sockets formed in the plate 50 on the opposite wall of the machine.

51 designates a wire guard, the ends of which are secured in any suitable manner to the stripper plate 44, the guard being provided with two outwardly bent portions forming handles 52.

53 designates a wooden table provided at its forward end with a handle 54 and is adapted to ride on tracks 55 formed on the table 10.

56 designates a rack secured to the under face of the cutter frame which is adapted to be engaged by a dog 57 which operates through an opening 58 in the table, and which is pivotally mounted on the forward end of a slidably mounted rod 59 supported in brackets 60 and 61 on the lower side of the table.

62 designates a coiled spring on the rod 59 which abuts at one end against the bracket 61 and at the other end against a flange 63 formed on the rod 59.

64 designates a coiled spring, one end of which is secured to the bracket 60 and the other end is secured to the rod 59, the tension of the spring being to pull the rod 59 downwardly so that the dog 57 is out of engagement with the rack 56.

Means are provided for positively raising the rod 59 which consist of a cam 65 formed on the shaft, a cam 66 also on the shaft being provided to engage a roller 67 on the rod 59 to move the rod rearwardly when the dog 57 is in engagement with the rack 56. To prevent breaking of the dog 57, which might occur should the dog strike a tooth on the rack, instead of between the teeth, the dog 57 is pivotally mounted on a pin 68 on the rod 59. A spring 69 is mounted on the pin 68, one end of which engages a stud 70 on the rod 59, and the other end of the spring engages under the dog, thereby tending to elastically hold the dog in raised position.

The stud 70 extends through a slot 71 formed in the dog 57 and thereby limits the movement of the dog on the rod.

75 and 76 represent front and rear doors which are hinged or movably attached to the cover 13, as indicated at 77, these doors being closed, as shown in the full line position in Fig. 2, when the machine is not in operation, and being raised into the dotted line position shown in Fig. 2 when the machine is in operation.

The machine is operated in the following manner:

The table 53 is drawn forwardly into the position shown in dotted lines in Fig. 2 and the meat, such as a steak, placed thereon, after which the machine is set in motion by operation of the handle 80 on a fly wheel secured to the end of the shaft 17. The shaft being rotated, a reciprocating motion is transmitted to the cutter frame 25 through the medium of the connecting rods 18. The cutter frame 25 during such movement carries with it the spring arms 30, the cutter heads 38, and the knives 42, the respective spring arms 30 being yieldingly held seated on the cutter frame by means of the springs 31. This reciprocating movement of the parts just described causes the knives to enter the meat on the table 53 and partially penetrate the same, during which operation the sinews or fibrous material in the meat is broken up by a series of cuts made by the knives 42. When the knives are in the lower position shown in Fig. 2, the dog 57 has just engaged the rack 56 on the lower face of the table 53, the dog being raised into engagement with the rack by means of the cam 65 engaging under and raising the rod 59. As the knives 42 move upwardly, the cam 66 comes into engagement with the roller 67 on the rod 59 and moves the rod 59 rearwardly, thereby causing the cam 59 to move the table 53 and meat thereon forwardly into the machine in position to receive the knives into another portion of the meat. After the cam 66 passes from engagement with the roller 67, the spring 62 on the rod 59 moves the rod 59 forward to its original position, the cam 65 having permitted the rod 59 to drop and the dog 57 to come out of engagement with the rack 56. In the event that the knives should strike a hard substance, such as bone, the cutter head 38 carrying such knives is permitted to move upwardly elastically against the action of the spring 31 on the spring arm 30 to which such cutter head is attached, thereby permitting the balance of the knives to perform their work of cutting the sinews in the other portions of the meat. The stripper plate 44 may be readily removed from the machine by grasping the handle or handles 52 and moving the plate sidewise out of engagement with the sockets in the plate 50, which action is permitted by virtue of the opposite end of the stripper plate being mounted in the spring plate 48.

It is understood that the machine is operated until the meat has entirely passed under the cutters, after which the table 53 may be drawn forwardly and the meat removed.

We claim as our invention:—

1. A meat fiber cutting machine comprising a table, a support for said table, a meat-board slidably mounted on the table, a cutter frame pivotally mounted on said support, a series of arms pivotally mounted on said support, means for elastically holding said arms on said frame, a series of blades mounted on each of said arms, and means for reciprocating said cutter frame.

2. A meat fiber cutting machine comprising a table, a support for said table, a meat-board slidably mounted on the table, a cutter frame pivotally mounted on said support, a series of arms pivotally mounted on said support, means for elastically holding said arms on said frame, a head removably mounted on each arm, a series of knives mounted in each of said heads, and means for imparting a substantially vertical reciprocating movement to said frame.

3. A meat fiber cutting machine comprising a table, a support for said table, a meat-board slidably mounted on the table, a shaft mounted on said support, a cutter frame pivotally mounted on said shaft, a series of arms pivotally mounted on said shaft, means for elastically holding said arms seated on said frame, a cutter head removably mounted on each of said arms, a series of knives mounted in each of said heads, a driving shaft mounted in said support, means for connecting said driving shaft to said cutter frame, and means operated by said driving shaft for imparting an intermittent movement to said meat-board.

4. A meat fiber cutting machine comprising a table, a support for said table, a meat-board slidably mounted on said table, a shaft mounted in said support, a cutter frame mounted on said shaft, a series of arms mounted on said shaft, a spring member carried on each of said arms, means on said frame for engaging said spring members to elastically hold said arms on said frame, a cutter head detachably secured to each arm, a series of knives mounted on each head, and means for reciprocally operating said frame.

5. A meat fiber cutting machine comprising a table, a support for said table, a meat-board slidably mounted on said table, means on said support for engaging the upper edge of said board, a meat cutter mounted on said support, a driving shaft, a rack on the under side of said board, a bar slidably supported under said table, elastic means for moving said bar forwardly, a dog on said bar, means on said driving shaft to lift said bar to cause said dog to engage said rack, means on said shaft adapted to engage said bar to move said bar rearwardly when said dog is in engagement with the rack, and means connected to said driving shaft for operating said cutter.

In testimony whereof, we have hereunto set our hands at Los Angeles, California, this 21st day of November, 1916.

THOMAS J. CARRIGAN.
JOHN B. EASTMAN.
MATTHEW E. MAGILL.